(12) United States Patent
Khader et al.

(10) Patent No.: US 9,161,074 B2
(45) Date of Patent: Oct. 13, 2015

(54) METHODS AND SYSTEMS FOR DISTRIBUTING INTERACTIVE CONTENT

(71) Applicant: Ensequence, Inc., Portland, OR (US)

(72) Inventors: Aslam Khader, Beaverton, OR (US); Larry Alan Westerman, Portland, OR (US); Mark-Andrew Ray Tait, Beaverton, OR (US)

(73) Assignee: Ensequence, Inc., Portland, OR (US)

( * ) Notice: Subject to any disclaimer, the term of this patent is extended or adjusted under 35 U.S.C. 154(b) by 240 days.

(21) Appl. No.: 13/874,268

(22) Filed: Apr. 30, 2013

(65) Prior Publication Data

US 2014/0325555 A1    Oct. 30, 2014

(51) Int. Cl.
*H04N 7/10*       (2006.01)
*H04N 21/2668*    (2011.01)
*H04N 21/234*     (2011.01)

(52) U.S. Cl.
CPC ..... *H04N 21/2668* (2013.01); *H04N 21/23418* (2013.01)

(58) Field of Classification Search
CPC .......................... H04N 21/2668; H04N 21/431
See application file for complete search history.

(56) References Cited

U.S. PATENT DOCUMENTS

| | | | |
|---|---|---|---|
| 3,919,479 A | 11/1975 | Moon | |
| 4,677,466 A | 6/1987 | Lert, Jr. | |
| 4,739,398 A | 4/1988 | Thomas | |
| 5,581,658 A | 12/1996 | O'Hagan | |
| 6,006,256 A | 12/1999 | Zdepski | |
| 6,771,885 B1 | 8/2004 | Agnihotri | |
| 6,968,337 B2 | 11/2005 | Wold | |
| 7,333,864 B1 | 2/2008 | Herley | |
| 7,363,278 B2 | 4/2008 | Schmelzer | |
| 7,451,078 B2 | 11/2008 | Bogdanov | |
| 7,461,002 B2 | 12/2008 | Crockett | |
| 7,500,007 B2 | 3/2009 | Ikezoye | |
| 7,509,267 B1 | 3/2009 | Yarmolich | |
| 7,529,659 B2 | 5/2009 | Wold | |
| 7,562,012 B1 | 7/2009 | Wold | |
| 7,565,327 B2 | 7/2009 | Schmelzer | |
| 7,590,259 B2 | 9/2009 | Levy | |
| 7,602,978 B2 | 10/2009 | Levy | |
| 7,634,787 B1 | 12/2009 | Gebhardt | |
| 7,694,318 B2 | 4/2010 | König | |
| 7,707,088 B2 | 4/2010 | Schmelzer | |
| 7,738,704 B2 | 6/2010 | Lienhart | |
| 7,739,062 B2 | 6/2010 | Wang | |
| 7,870,574 B2 | 1/2011 | Kenyon | |
| 7,877,438 B2 | 1/2011 | Schrempp | |

(Continued)

OTHER PUBLICATIONS

J. Haitsma and T. Kalker, "A Highly Robust Audio Fingerprinting System,"Proc. Int. Conf. Music Information Retrieval, 2002, pp. 107-115, Paris, France.

(Continued)

*Primary Examiner* — Junior Mendoza
(74) *Attorney, Agent, or Firm* — Kristine Elizabeth Matthews

(57) ABSTRACT

Aspects of the present invention relate to methods and systems for controlling the distribution of supplementary content by generating a first control signal when known content is initially detected in a broadcast stream, and after generating the first control signal, generating a second control signal when the detected content is no longer detected in the broadcast stream. The first and second control signals may be used to control the distribution of supplementary content.

11 Claims, 13 Drawing Sheets

(56) References Cited

U.S. PATENT DOCUMENTS

| | | |
|---|---|---|
| 7,907,211 B2 | 3/2011 | Oostveen |
| 7,930,714 B2 | 4/2011 | König |
| 7,970,167 B2 | 6/2011 | Rhoads |
| 8,006,314 B2 | 8/2011 | Wold |
| 8,082,150 B2 | 12/2011 | Wold |
| 8,086,445 B2 | 12/2011 | Wold |
| 8,352,259 B2 | 1/2013 | Bogdanov |
| 2007/0250716 A1* | 10/2007 | Brunk et al. ................. 713/176 |
| 2010/0153993 A1 | 6/2010 | Konig |
| 2010/0290666 A1 | 11/2010 | Rhoads |
| 2011/0041154 A1 | 2/2011 | Olson |
| 2011/0247042 A1 | 10/2011 | Mallinson |
| 2011/0247044 A1 | 10/2011 | Jacoby |
| 2012/0020647 A1 | 1/2012 | Vogel |
| 2012/0029670 A1 | 2/2012 | Mont-Reynaud |
| 2012/0210339 A1 | 8/2012 | Cheng |
| 2012/0215329 A1 | 8/2012 | Jiang |
| 2012/0240151 A1 | 9/2012 | Tapper |
| 2012/0272263 A1 | 10/2012 | Sharma |
| 2013/0014151 A1 | 1/2013 | Tallapaneni |
| 2013/0198768 A1* | 8/2013 | Kitazato ......................... 725/19 |
| 2013/0205326 A1* | 8/2013 | Sinha et al. ..................... 725/23 |
| 2014/0115644 A1* | 4/2014 | Kim et al. ..................... 725/109 |
| 2014/0250450 A1* | 9/2014 | Yu et al. ......................... 725/19 |
| 2014/0250479 A1* | 9/2014 | Lee et al. ..................... 725/110 |

OTHER PUBLICATIONS

Chun-Shien Lu, "Audio Fingerprinting based on Analyzing Time-Frequency Localization of Signals", 5th Int. Workshop MMSP, 2002, pp. 174-177, IEEE, US Virgin Islands.

* cited by examiner

Episode A:

| Intro | S2a | S3a | S4a | S5a | S6a | S7a | S8a | S9a |

Episode B:

| Intro | S2b | S3b | S4b | S5b | S6b | S7b | S8b |

Episode C:

| Intro | S2c | S3c | S4c | S5c | S6c | S7c | S8c | S9c | S10c |

Episode A: | Intro | S2a | S3a | S4a | S5a | S6a | S7a | S8a | S9a |

602

Episode B: | Intro | S2b | S3b | S4b | S5b | S6b | S7b | S8b |

604

As broadcast: | Intro | S2a | C1 | S3a | S4a | C2 | S5a | S6a | C3 | S7a | C4 | S8a | S9a |

Episode B:

| Intro | S2b | S3b | S4b | S5b | S6b | S7b | S8b |

604

As broadcast:

| Intro | S2a | C1 | S3a | S4a | C2 | S5a | S6a | C3 | S7a | C4 | S8a | S9a |

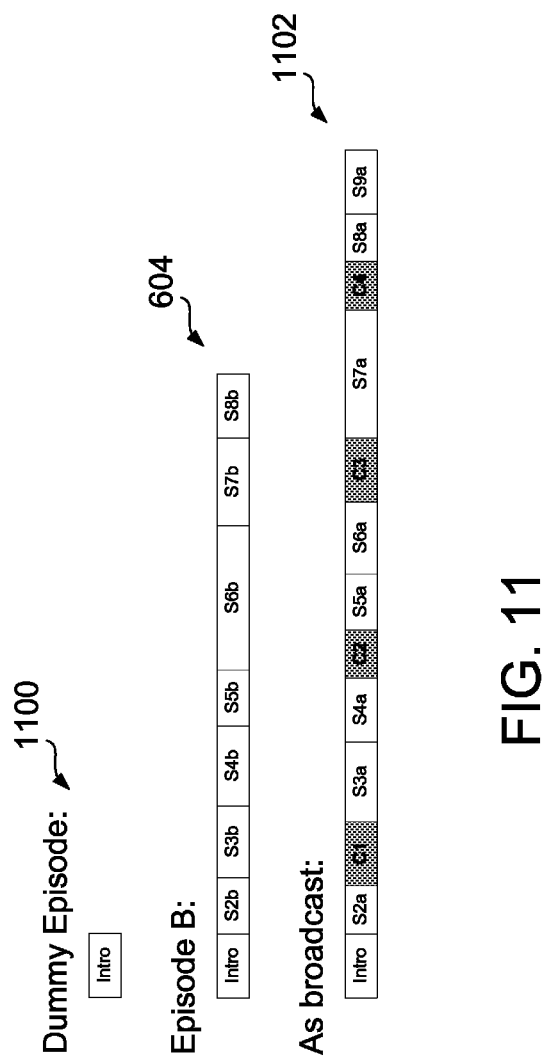

METHODS AND SYSTEMS FOR DISTRIBUTING INTERACTIVE CONTENT

FIELD OF THE INVENTION

Embodiments of the present invention relate generally to methods and systems for the distribution of interactive content in a broadcast stream and, in particular, to methods and systems for distributing interactive content using a content fingerprint.

BACKGROUND OF THE INVENTION

An ability to provide viewer-selectable interactivity in conjunction with audio-video content may be a desirable capability in a broadcast-television system. A required capability in a system intended for this purpose may be an ability to control interactivity during discontinuities in program content, for example, commercial breaks, emergency broadcast interruptions, and other program-content discontinuities. Existing systems for providing viewer-selectable interactivity in conjunction with audio-video content may be problematic in many broadcast environments because of existing systems' reliance on specific signaling content in the broadcast stream. No standardized method for conveying such signals is provided across the multiple broadcast methodologies, for example, cable, terrestrial, satellite, Internet Protocol, and other broadcast methodologies, that may be used to distribute program content. Furthermore, signals that are introduced into a broadcast stream at one point in a distribution chain may be modified or removed at a later point in the processing of the broadcast stream prior to reception by the viewer. Additionally, the insertion of commercial content into program content may vary with respect to the timing, duration and identity of the commercial content during each unique broadcast of a particular piece of program content and for each method of broadcast of the program content. Due to this variability, existing systems may require control signals be inserted specifically for each presentation of the program content.

Methods and systems that control the distribution of interactive content in a broadcast-television environment by recognizing program content in the broadcast stream in the absence of specific control signals in the broadcast stream; inserting appropriate supplementary content into the broadcast stream when program content is recognized; and ceasing to insert supplementary content in the broadcast stream when program content is interrupted may be desirable.

SUMMARY OF THE INVENTION

Embodiments of the present invention relate to systems and methods for controlling the distribution of supplementary content, in a broadcast system, by receiving a media content comprising at least one of an audio content and a video content and receiving supplementary content associated with the received media content; monitoring a broadcast stream; detecting the at least one of the audio content and the video content of the media content in the broadcast stream; upon initially detecting the media content, selecting supplementary content based on the detected media content, generating a first control signal, and using the first control signal to control the distribution of the selected supplementary content; and after generating a first control signal and upon failing to detect the media content in the broadcast stream, generating a second control signal and using the second control signal to control the distribution of the selected supplementary content.

One aspect of the present invention teaches systems and methods for receiving media content comprising at least one of an audio content and a video content, receiving supplementary content associated with the media content, and assigning a unique identifier to the enhanced media content comprising the media content and the supplementary content.

Another aspect of the present invention teaches methods and systems for detecting content by creating a first database and storing in the first database a plurality of reference fingerprints generated from at least one of audio content and video content of the received media content, unique identifiers for the media content, and associations between the unique identifiers and the plurality of generated fingerprints; and when monitoring a broadcast stream, generating fingerprints from at least one of an audio content and a video content in the broadcast stream, comparing the generated fingerprints with the plurality reference fingerprints in the first database, and determining whether, or not, a match between a generated fingerprint and a reference fingerprint exists.

In a still further aspect of the present invention, the step of detecting content also includes finding a matching fingerprint in the first database and extracting the unique identifier associated with the matching fingerprint from the first database.

A still further aspect of the present invention teaches creating a second database and storing supplementary content, unique identifiers, and associations between the unique identifiers and the supplementary content in the second database; and upon detecting media content, determining the unique identifier of the detected media content, and using the unique identifier to extract supplementary content from the second database.

A still further aspect of the present invention teaches using the first control signal to control the distribution of the selected supplementary content by, upon generating the first control signal, inserting the supplementary content into the broadcast stream.

A still further aspect of the present invention teaches using the second control signal to control the distribution of the selected supplementary content by, upon generating the second control signal, ceasing to insert the supplementary content into the broadcast stream.

BRIEF DESCRIPTION OF THE DRAWINGS

The preferred and alternative embodiments of the present invention are described in detail below with reference to the following drawings.

FIG. 9 is a schematic representation of an exemplary broadcast of one of two episodes of a television show;

FIG. 10 is a schematic representation of an exemplary broadcast of one of two episodes of a television show; and FIG. 11 is a schematic representation of an exemplary broadcast of an episode of a television show.

DETAILED DESCRIPTION OF THE INVENTION

Figure 1:
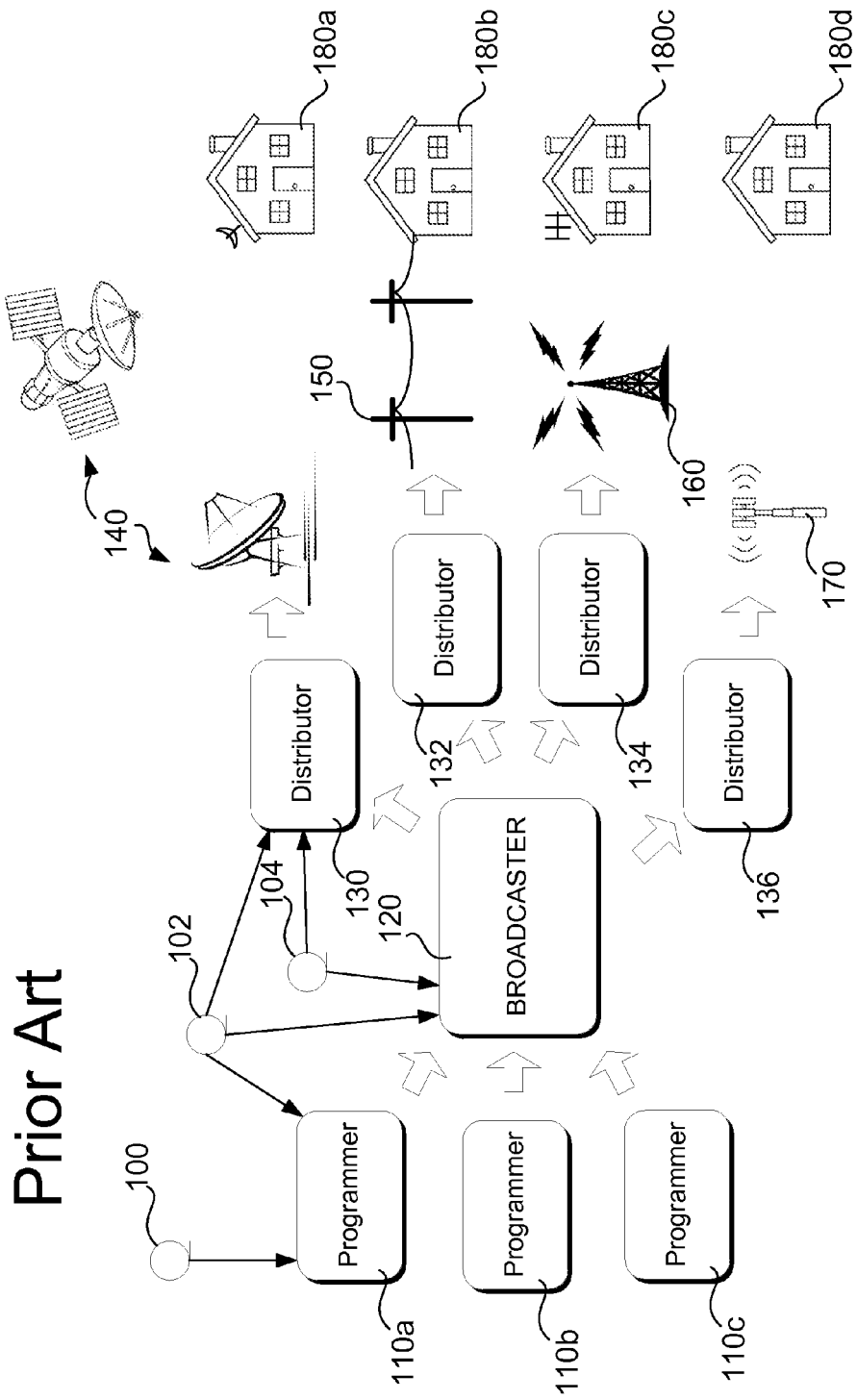
FIG. 1 is a diagram of an exemplary system for distributing program content (prior art)

By way of overview, embodiments of the present invention provide methods and systems for controlling the distribution of supplementary content by receiving a content comprising at least one of an audio content and a video content and receiving supplementary content associated with the media content; monitoring a broadcast stream; detecting the at least one of the audio content and the video content of the media content in the broadcast stream; upon initially detecting the media content, selecting supplementary content based on the detected media content, generating a first control signal, and using the first control signal to control the distribution of the selected supplementary content; and after generating a first control signal and upon failing to detect the media content in the broadcast stream, generating a second control signal and using the second control signal to control the distribution of the selected supplementary content.

A further embodiment of the present invention provides systems and methods for receiving media content comprising at least one of an audio content and a video content, receiving supplementary content associated with the media content, and assigning a unique identifier to the enhanced media content.

Yet a further embodiment of the present invention provides methods and systems for detecting content by creating a first database and storing in the first database a plurality of reference fingerprints generated from at least one of audio content and video content of received media content, unique identifiers for the media content, and associations between the unique identifiers and the generated plurality of reference fingerprints; and when monitoring a broadcast stream, generating fingerprints from at least one of the audio content and video content in the broadcast stream, comparing the generated fingerprints with the plurality of reference fingerprints in the first database, and determining whether, or not, a match between a generated fingerprint and a reference fingerprint exists.

Yet a further embodiment of the present invention provides methods and systems for detecting content that also includes the step of finding a matching reference fingerprint in the first database and extracting the unique identifier associated with the matching reference fingerprint from the first database.

Yet a further embodiment of the present invention provides methods and systems for detecting content that also includes the step of creating a second database and storing supplementary content, unique identifiers, and associations between the unique identifiers and the supplementary content in the second database; and upon detecting media content, determining the unique identifier of the detected media content, and using the unique identifier to extract supplementary content from the second database.

Yet a further embodiment of the present invention provides methods and systems for controlling the distribution of supplementary content that also includes the step of using the first control signal to control the distribution of the selected supplementary content by, upon generating the first control signal, inserting the supplementary content into the broadcast stream.

Yet a further embodiment of the present invention provides methods and systems for controlling the distribution of supplementary content that also includes the step of using the second control signal to control the distribution of the selected supplementary content by, upon generating the second control signal, ceasing to insert the supplementary content from the broadcast stream.

As used herein, the term "program" refers to a body of audio content and/or video content intended to be consumed by a viewer as a unified entity for entertainment, diversion, information, education or other viewer-related purposes. Program content may be produced by a "programmer," for example, an individual, a group, a commercial company, a non-profit organization, or other program-content-production entity. A "series" is a set of programs that share common thematic, stylistic, and/or structure elements, and are intended to be consumed as an artistic whole. Each of the set of programs in a series is an "episode" of the series.

As used herein, the phrase "secondary content" refers to non-program audio and/or video content, for example, advertisements, news items, public service announcements, station identification spots and other non-program content. In a broadcast system, program content may be presented in a discontinuous fashion with various elements of secondary content interleaved within the program content.

As used herein, the phrase "supplementary content" refers to at least one of audio, video, still images, text, executable code, and other data intended for distribution and consumption with primary content, for example, program content or secondary content. Supplementary content may be associated with program content or with secondary content.

As used herein, the phrase "media content" refers to program content or secondary content.

As used herein, the phrase "program stream" refers to a sequence of analog or digital data comprising program and secondary content, and possibly including supplementary content.

As used herein, the phrase "broadcast stream" refers to an aggregation of one or more program streams.

As used herein, the terms "broadcast" and "broadcasting" refer to the process of aggregating program content, secondary content, and possibly supplementary content into at least one program stream, aggregating one or more program streams into a broadcast stream, and delivering the broadcast stream to one or more entities. Elements of program, secondary, and supplementary content may be inserted, removed, modified, or replaced during the generation and manipulation of a program stream. A "broadcaster" is an entity that operates a broadcast system.

As used herein, the terms "distribute" and "distribution" refer to the process of delivering a broadcast stream to viewers through a physical delivery network. The physical delivery network may utilize wired, wireless, or a combination of wired and wireless means. A "distributor" is an entity that operates a distribution system. A broadcast stream may be modified during distribution by inserting, removing, modifying or replacing elements of one or more program stream within the broadcast stream.

As used herein, the terms "interactive" and "interactivity" refer to the capability in a viewing environment for a viewer to control the presentation of program, secondary, and/or supplementary content through direct or indirect manipulation of an interface through a remote control, mouse, keyboard, touch panel, movement recognition camera, microphone and other interface mechanisms.

As used herein, the term "fingerprint" refers to a value or set of values computed as a condensed mathematical representation of the signal content for some subset of the video and/or audio content of a program.

The various aspects of the claimed subject matter are now described with reference to the annexed drawings. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" as used herein is intended to encompass a computer application accessible from any computer-readable device, carrier, or media. Additionally it should be appreciated that a carrier wave can be employed to carry computer-readable electronic data such as those used in transmitting and receiving electronic mail or in accessing a network such as the Internet or a local area network. Of course, those skilled in the art will recognize many modifications may be made to this configuration without departing from the spirit and scope of the claimed subject matter.

The term "computer" is used herein to refer to any device with processing capability such that it can execute instructions. Those skilled in the art will realize that such processing capabilities are incorporated into many different devices and therefore the term "computer" includes PCs, servers, mobile telephone, tablet computers, personal digital assistants and many other devices.

The steps of the flowcharts described herein may be performed by software executing on hardware, by specialized hardware systems, or by a combination of software and specialized hardware. Certain steps of the flowcharts may be amenable to manual performance, but in general the flowcharts represent processes or operations that require hardware systems for their realization.

The methods described herein may be performed by software in machine readable form on a storage medium. The software can be suitable for execution on a parallel processor or a serial processor such that the method steps may be carried out in any suitable order, or simultaneously.

The description acknowledges that software can be a valuable, separately tradable commodity. The description is intended to encompass software, which runs on or controls 'dumb' or standard hardware, to carry out the desired functions. It is also intended to encompass software which 'describes' or defines the configuration of hardware, such as HDL (hardware description language) software, as is used for designing silicon chips, or for configuring universal programmable chips, to carry out desired functions.

The steps of the methods described herein may be carried out in any suitable order, or simultaneously where appropriate. Aspects of any of the examples described herein may be combined with aspects of any of the other examples described to form further examples without losing the effect sought.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs), and any type of media or device suitable for storing instructions and/or data.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

FIG. 1 depicts an exemplary view of the prior art for distributing program content. Program content 100 may be created or acquired by one or more programmers (three shown) 110a, 110b, 110c. Supplementary content 102 may also be created or acquired by one or more programmers 110a, 110b, 110c. Programmers 110a, 110b, 110c may provide content 100 to one or more broadcasters (one shown) 120. A programmer 110a, 110b, 110c may provide program content to one or to more than one broadcaster (one shown) 120. A broadcaster 120 may aggregate program content 100. A broadcaster 120 may also acquire or create supplementary content 102 for association with program content 100. A broadcaster 120 may also acquire or create secondary content 104 for broadcast with program content 100 and supplementary content 102. A broadcaster 120 may create one or more program streams by aggregating and interleaving program content 100, supplementary content 102, and secondary content 104. A broadcaster 120 may deliver program streams to one or more distributors (four shown) 130, 132, 134, 136. A broadcaster 120 may delivery any given program stream to one or to more than one distributor (four shown) 130, 132, 134, 136.

A distributor 130, 132, 134, 136 may receive program streams from one or from more than one broadcaster (one shown) 120. A distributor 130, 132, 134, 136 may aggregate multiple program streams for broadcast distribution to viewers. A distributor 130 may also receive supplementary content 102 and secondary content 104 from one or more sources, and may insert, replace, modify, or remove supplementary content 102 and secondary content 104 in a program stream prior to broadcast distribution.

A distributor 130, 132, 134, 136 may utilize one or more physical distribution methods and systems. In this example, distributor 130 utilizes satellite system 140 to distribute broadcast content to a viewer household 180a. Distributor 132 utilizes cable system 150 to distribute broadcast content to a viewer household 180b. Distributor 134 uses terrestrial broadcast antenna 160 to distribute broadcast content to a viewer household 180c. Distributor 136 uses wireless telephone system 170 to distribute broadcast content to a viewer household 180d. The illustrated distribution methods are exemplary, and are not intended to limit the variety or range of broadcast content-distribution methods. Any one household 180a, 180b, 180c, 180d may receive broadcast content through one or through more than one distribution systems. Distributors 130, 132, 134, 136 may also provide return path communication capabilities to households 180a, 180b, 180c, 180d that may utilize the same or different communication path as does the broadcast content-distribution system. For example, a satellite distributor 130 may utilize a wired or wireless telephony system to provide return path communication to a household 180a.

Figure 2:
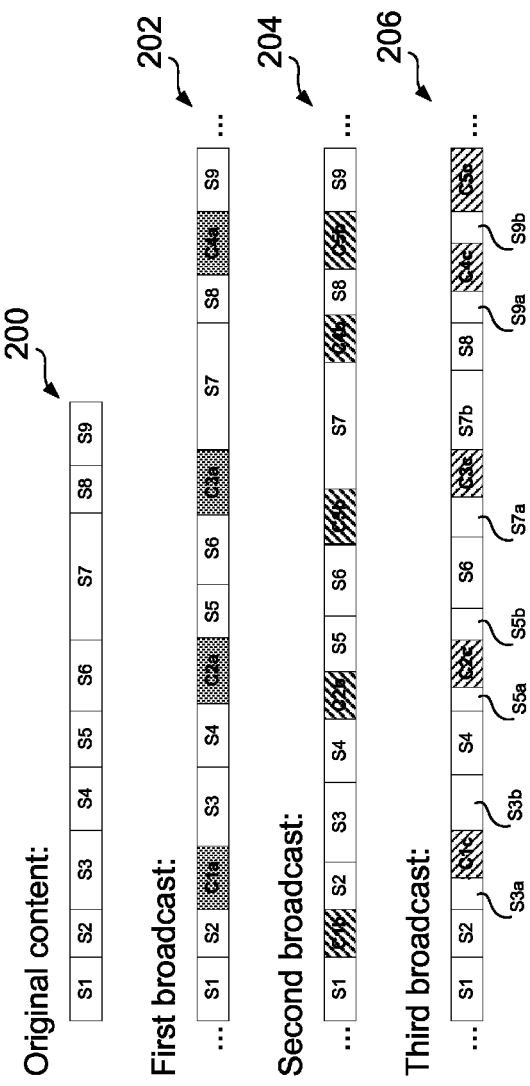
FIG. 2 is an exemplary schematic representation of multiple broadcasts of an episode of a television show (prior art)

FIG. 2 demonstrates an example of an issue that embodiments of the current invention address. The original content 200 of a program episode may consist of a series of scenes, here represented by content segments labeled S1 to S9. The scenes may be of varying length, and the total duration of the program content is less than the broadcast interval within which the program content is conveyed. For example, if an episode is intended to be shown within a 30 minute time slot, the program content of the episode may be 22 minutes in length. The remaining eight minutes of the broadcast time slot is occupied by secondary content, for example, advertisements, promotions, station identification, previews and other secondary content. The secondary content may be interleaved with segments of the program content.

In this example, the first broadcast 202 of the program content consists of the first two scenes S1, S2 of the program content, followed by an interstitial pod C1a that may comprise advertisements, promotions, public service announcements, news bulletins, station identification, and the like. The content of interstitial pods may be the same for every distributor that distributes the program content, or may be different for each distributor. Following interstitial pod C1a, scenes S3 and S4 of the program content are broadcast, followed by a second interstitial pod C2a. Following interstitial pod C2a, scenes S5 and S6 are broadcast, following by a third interstitial pod C3a. Following interstitial pod C3a, scenes S7 and S8 are broadcast, following by a fourth interstitial pod C4a. Following interstitial pod C4a, scene S9 is broadcast, completing the broadcast interval. For the first broadcast 202, the timing of the interstitials reflects the program scene boundaries. The duration of the interstitials varies among the interstitials over the course of the broadcast interval.

Further in the example depicted in FIG. 2, the second broadcast 204 of the program content consists of the first scene S1, followed by an interstitial pod C1b, followed by scenes S2, S3, and S4, followed by a second interstitial pod C2b, and so forth, as illustrated, to the end of the broadcast interval. While the timing of the interstitials in the second broadcast 204 reflects the program scene boundaries, the locations and durations of the interstitials differ between the first broadcast and the second broadcast.

Still further in the example depicted in FIG. 2, the third broadcast 206 of the program content consists of the first scene S1, followed by scene S2, followed by a portion of scene S3, denoted S3a, followed by a first interstitial pod C1c. The first interstitial pod C1c occurs during a scene, and thus is not synchronized with the specific content structure of the program. Following interstitial pod C1c, the remainder of scene S3, denoted S3b, is broadcast, followed by scene S4, followed by a portion of scene S5, denoted S5a, followed by a second interstitial C2c and the remainder of scene S5, denoted S5b. This pattern is repeated, as illustrated, until the end of the broadcast interval. In this example third broadcast 204, the first four interstitials C1c, C2c, C3c, and C4c occur at regular intervals, irrespective of the scene structure of the original content, and a fifth interstitial C5c occurs at the end of the broadcast interval to fill the duration of the broadcast interval.

In FIG. 2 the patterning depicted in the various interstitials, dot-fill for the first broadcast 202, back cross-hatch for the second broadcast 204, forward cross-hatch for the third broadcast 206, is intended to emphasize the fact that the contents of a given interstitial, for example C1a, C1b, C1c, need not be the same from one broadcast interval to another. The particulars of the first interstitial C1a in the first broadcast 202 of the program content may bear no relationship to the particulars of the first interstitial C1b in the second broadcast 204 or the first interstitial C1c in the third broadcast 206 of the program content, whether in offset, duration, or content. The placement of interstitials may but need not respect the scene boundaries in the program content.

Consideration of the elements of FIG. 2 highlights an issue that arises in the broadcast of enhanced broadcast content. Enhanced broadcast content comprises original program content, plus supplementary content related to the program content, but distinct from it. Enhanced broadcast content may include interactive content intended to be displayed to and manipulated by the viewer. For a variety of reasons, including for example esthetics and contractual obligations, supplementary content related to the program content should not be visible or interactive to the viewer during interstitials in broadcast content. For example, consider an interactive program that displays trivia facts about the program content as the content is broadcast. When an interstitial occurs, the trivia facts should not be visible to the viewer, because the display of the trivia facts may obscure advertising content. To properly manage the broadcast of enhanced broadcast content, a system is required that can broadcast supplementary content during the presentation of program content and interrupt the broadcast of supplementary content during breaks or gaps in the broadcasting of the program content. The three broadcast scenarios depicted in schematic form in FIG. 2 demonstrate some of the problems that such a system must overcome. The location, duration, and content of gaps in program content may vary from one broadcast of a program to another. The location of the gaps may not be known at the time the program content is created. The location of gaps in a broadcast stream may but need not respect scene boundaries in program content In some modern systems, broadcast content may be transiently stored and manipulated, for example by removing or modifying portions of the broadcast content to allow the insertion of new interstitial materials subsequent to the creation of a broadcast stream; this manipulation may have the side effect of modifying the duration and relative offsets of scenes within program content. In all such cases, the precise content of a broadcast stream containing a particular episode of a series may not be known or predictable in advance. A system that, during a broadcast, can dynamically determine the beginning and end of program content, and the presence and duration of interstitial content, within a broadcast interval, may be desirable. The system may then use these determinations to control the distribution of supplementary content.

Figure 3:
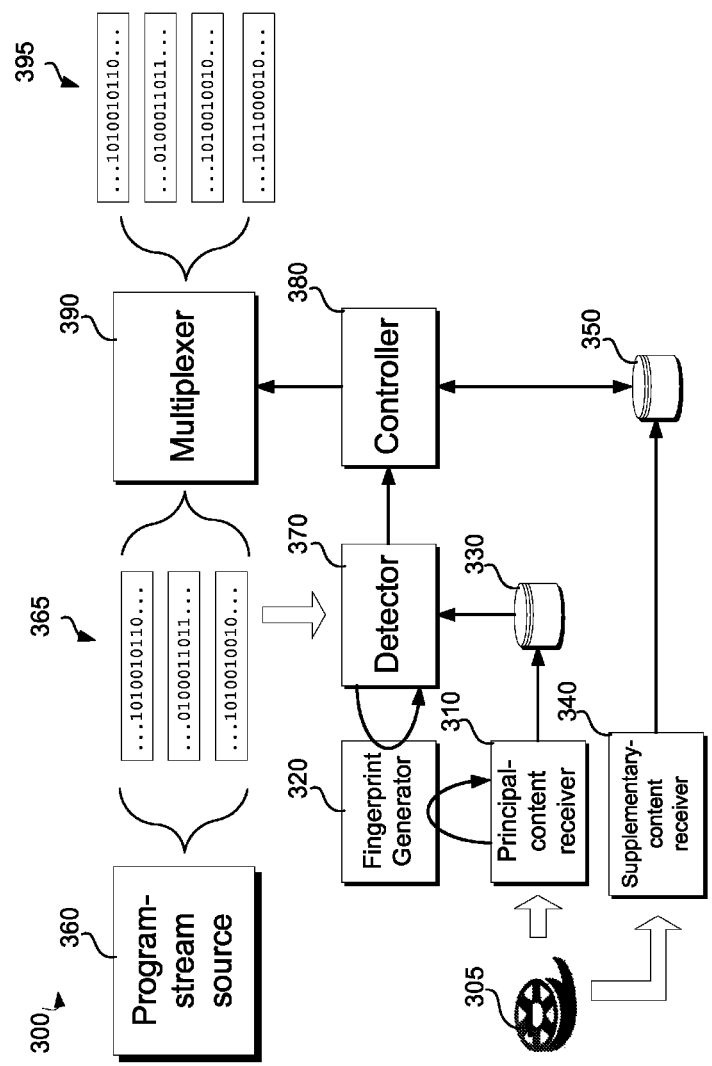
FIG. 3 depicts an exemplary system for practicing an aspect of embodiments of the present invention.

FIG. 3 depicts elements of an exemplary system 300 for practicing an aspect of the current invention. A content source 305 may provide program and/or secondary content to a principal-content receiver 310. When the principal content is received at the principal-content receiver 310, either or both of the audio and the video content may be passed to a fingerprint generator 320, whereat one or more reference fingerprints associated with the principal content may be generated according to a fingerprint-generation method known in the art. In alternative embodiments, a content source 305 may provide the one or more reference fingerprints directly to a principal-content receiver 310. The resulting one or more reference fingerprints may be stored in a fingerprint database 330. A unique identifier may associate the one or more reference fingerprints with the principal content from which they were generated. Content source 305 also may provide supplementary content to a supplementary-content receiver 340. The supplementary content may be stored in a supplementary-content database 350, along with a unique identifier that may associate the supplementary content with the principal content. In some embodiments of the present invention, the unique identifier used within the fingerprint database 330 to associate the one or more reference fingerprints with the principal content from which they were generated may be the same as the unique identifier used within the supplementary-content database 350 to associate the supplementary content with the principal content. In alternative embodiments, the identifiers may be distinct but associated with each other.

A program-stream source 360 may create a broadcast stream 365 comprising audio content and video content of one or more program content and secondary content. A portion of broadcast stream 365 may be monitored by a detector 370. The detector 370 may pass either or both of audio content and video content from the broadcast stream to the fingerprint generator 320. The resulting fingerprints generated from the broadcast stream may be compared with the one or more reference fingerprints from the fingerprint database 330. When a match is found, the detector 370 may produce a first control signal that may be passed to a controller 380, along with the unique identifier associated with the matched reference fingerprint. Upon receiving the first control signal, the controller 380 may use the unique identifier to extract supplementary content associated with the principal content from supplementary-content database 350, and the controller 380 may activate a multiplexer 390 to insert the extracted supplementary content into the broadcast stream 365, thereby producing an enhanced broadcast stream 395. Once a match has been found, the detector 370 continues to monitor the broadcast stream 365, generating fingerprints and comparing the generated fingerprints with the one or more reference fingerprints from the fingerprint database 330. When the detector 370 fails to find a match, the detector 370 may generate a second control signal that may be passed to the controller 380. Upon receiving the second control signal, the controller 380 may deactivate the multiplexer 390 to no longer insert the extracted supplementary content into the enhanced broadcast stream 395.

The system 300 depicted in FIG. 3 is intended to be exemplary, and one skilled in the art will recognize that many details and aspects of system 300 could be modified or altered without departing from the spirit and scope of the current invention. For example, in some embodiments of the present invention, principal content and supplementary content may come from the same source 305. In alternative embodiments, principal content and supplementary content may come from different sources (not shown). In some embodiments of the present invention, principal content and/or supplementary content may be received in tangible form. In alternative embodiments, principal and/or supplementary content may be received in intangible and evanescent form. In some embodiments of the present invention, content may be transported via physical media, for example, tape, disk, memory card, and other physical transportation means. In alternative embodiments of the present invention, content may be provided as evanescent digital or analog signals transmitted via wired or wireless communication means.

In some embodiments of the present invention, the fingerprint generator 320 may be realized as a single system accessible to both the principal-content receiver 310 and the detector 370. In alternative embodiments of the present invention (not shown), the fingerprint generator 320 may be realized as two separate implementations of fingerprint generator instances operating at different locations. In some embodiments of the present invention, the process of generating and storing reference fingerprints may occur at a time and/or place distinct from the time and/or place of the operation of the detector 370. The reference fingerprint database 330 for storing reference fingerprints may be implemented as a flat file stored on a physical medium, as a relational database implemented on a central server computer, as a virtual database implemented using cloud storage techniques, or by other equivalent methods well known in the art. Similarly, the supplementary-content database 350 may be implemented as a flat file, as a relational database, as a virtual database, or by other data storage and retrieval means well known in the art. In some embodiments of the present invention, the principal-content receiver 310 and supplementary-content receiver 340 may be realized as a single module. In alternative embodiments, the principal-content receiver 310 and the supplementary-content receiver 340 may be realized as separate modules. In some embodiments of the present invention, the fingerprint database 330 and the supplementary-content database 350 may be realized as separate databases. In alternative embodiments of the present invention, the fingerprint database 330 and the supplementary-content database 350 may be realized as a single database. The unique identifier associated with principal content and supplementary content may be provided by content source 305, or may be generated by principal content receiver 310, by supplementary content receiver 340, or by a separate unique identifier generator (not shown).

In some embodiments of the present invention, the program-stream source 360 may be a singular entity. In alternative embodiments, the program-stream source 360 may be multiple entities, each providing one or more content streams. The program stream 365 may be communicated via a wired or wireless network, and the program stream 365 may be communicated in digital or analog representation. The detector 370 and the controller 380 may be located in proximity to, or distant from, the program stream source 360, and/or the multiplexer 390, and/or each other. Monitoring of the program stream 365 may be performed by any of the well-known monitoring means known in the art, for example, electronic sampling; reception of unicast, multicast, or broadcast internet protocol traffic on a wired or wireless digital network; antenna reception of wireless electromagnetic signals; and other means known in the art. Communication between the detector 370 and the controller 380, and between the controller 380 and the multiplexer 390, may be by any conventional wired or wireless means known in the art.

While FIG. 3 depicts only a single instance of each element of system 300, this is not a limitation of the current invention. In alternative embodiments, other system topographies may be utilized that fall within the spirit and scope of the current invention. For example, a principal-content receiver 310 may communicate with multiple fingerprint generators (one shown) 320; likewise, multiple principal-content receivers (one shown) 310 may communicate with a single fingerprint generator 320. A principal-content receiver 310 may store fingerprints in multiple fingerprint databases (one shown) 330; likewise, multiple principal-content receivers (one shown) 310 may store fingerprints in a single fingerprint database 330. A supplementary-content receiver 340 may store supplementary content in multiple supplementary-content databases (one shown) 350; likewise, multiple supplementary-content receivers (one shown) 340 may store supplementary content in a single supplementary-content database 350. A detector 370 may communicate with a multiple fingerprint generators (one shown) 320; likewise multiple detectors (one shown) 370 may communicate with a single fingerprint generator 320. A detector 370 may communicate with multiple fingerprint databases (one shown) 330; likewise, multiple detectors (one shown) 370 may communicate with a single fingerprint database 330. A controller 380 may communicate with multiple supplementary-content databases (one shown) 350; likewise, multiple controllers (one shown) 380 may communicate with a single supplementary-content database 350. A detector 370 may monitor multiple program streams (one shown) 365; likewise, multiple detectors (one shown) 370 may monitor a single program stream 365. A detector 370 may communicate with a multiple controllers (one shown) 380; likewise, multiple detectors (one shown) 370 may communicate with a single controller 380. A controller 380 may communicate with multiple multiplexers (one shown) 390; likewise multiple controllers (one shown) 380 may communicate with a single multiplexer 390. The insertion of supplementary content may be performed multiple times on a single program stream, in parallel, in series, or as a combination of series and parallel operations. The foregoing list is not intended to be exhaustive of the possible alternative embodiments of system 300, but is exemplary of a range of implementations that fall within the spirit and scope of the current invention.

Figure 4:
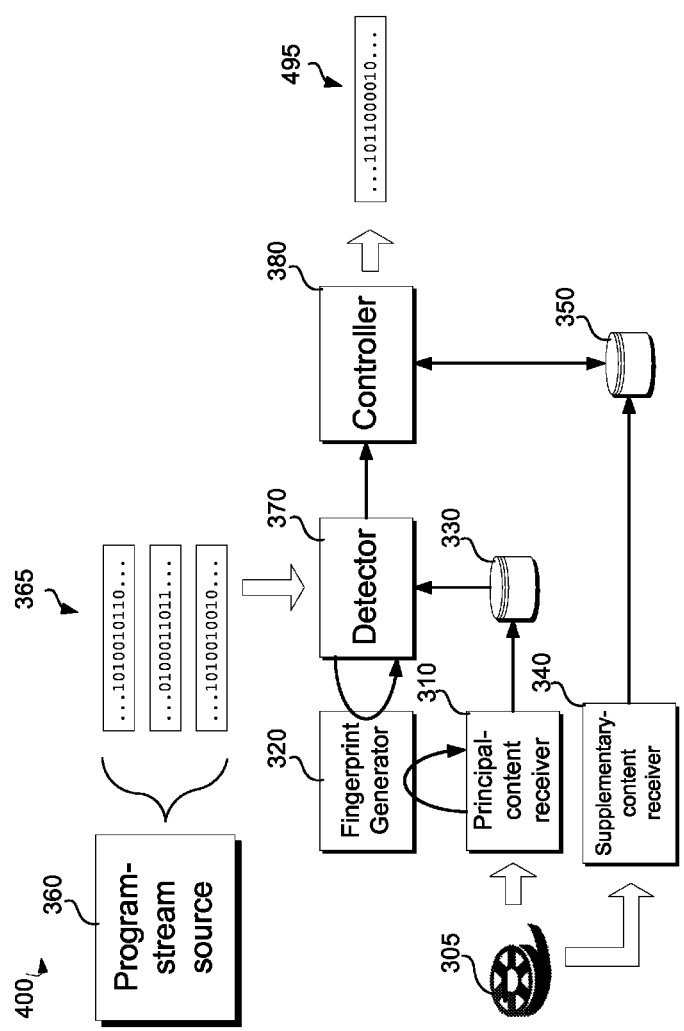
FIG. 4 depicts an alternative embodiment of an exemplary system for practicing an aspect of embodiments of the present invention.

FIG. 3 illustrates the distribution of supplementary content, according to embodiments of the present invention, by incorporating the supplementary content into an enhanced broadcast stream. FIG. 4 depicts exemplary alternative embodiments 400 of the current invention in which supplementary-content broadcast stream 495 may be distributed through a communication channel that is distinct from the communication channel through which the broadcast stream 365 may be distributed. In the alternative embodiments 400, a content source 305 may provide principal content to a principal-content receiver 310 for processing and storage as described above, and the content source 305 may provide supplementary content to a supplementary-content receiver 340 for storage as described above. A detector 370 may monitor a broadcast stream 365 produced from program streams provided by program stream source 360 as described above. The detector 370 may pass control signals and unique identifiers to a controller 380 as described above. The controller 380 may receive supplementary content from a supplementary-content database 350 as described above. The controller 380 may provide supplementary content 495 retrieved from the supplementary-content database 350 through a wired or wireless communication path independent of the communication path used by broadcast stream 365. For example, in some alternative embodiments 400 a broadcast stream 365 may be communicated through a terrestrial broadcast system, while supplementary content 495 may be communicated through a wired Internet Protocol (IP) communication system.

In an alternative embodiment, supplementary content 495 may be distributed by a web server that receives supplementary content 495 and first and second control signals from controller 380 through any suitable communication means, for example, a wired IP communication system. In some embodiments, the web server may manage the distribution of supplementary content 495 such that supplementary content 495 may be supplied in response to a query from a client device after the first control signal is generated and received by the web server, but supplementary content 495 may no longer be supplied in response to a query from a client device after the second control signal is generated and received by the web server.

Figure 5:
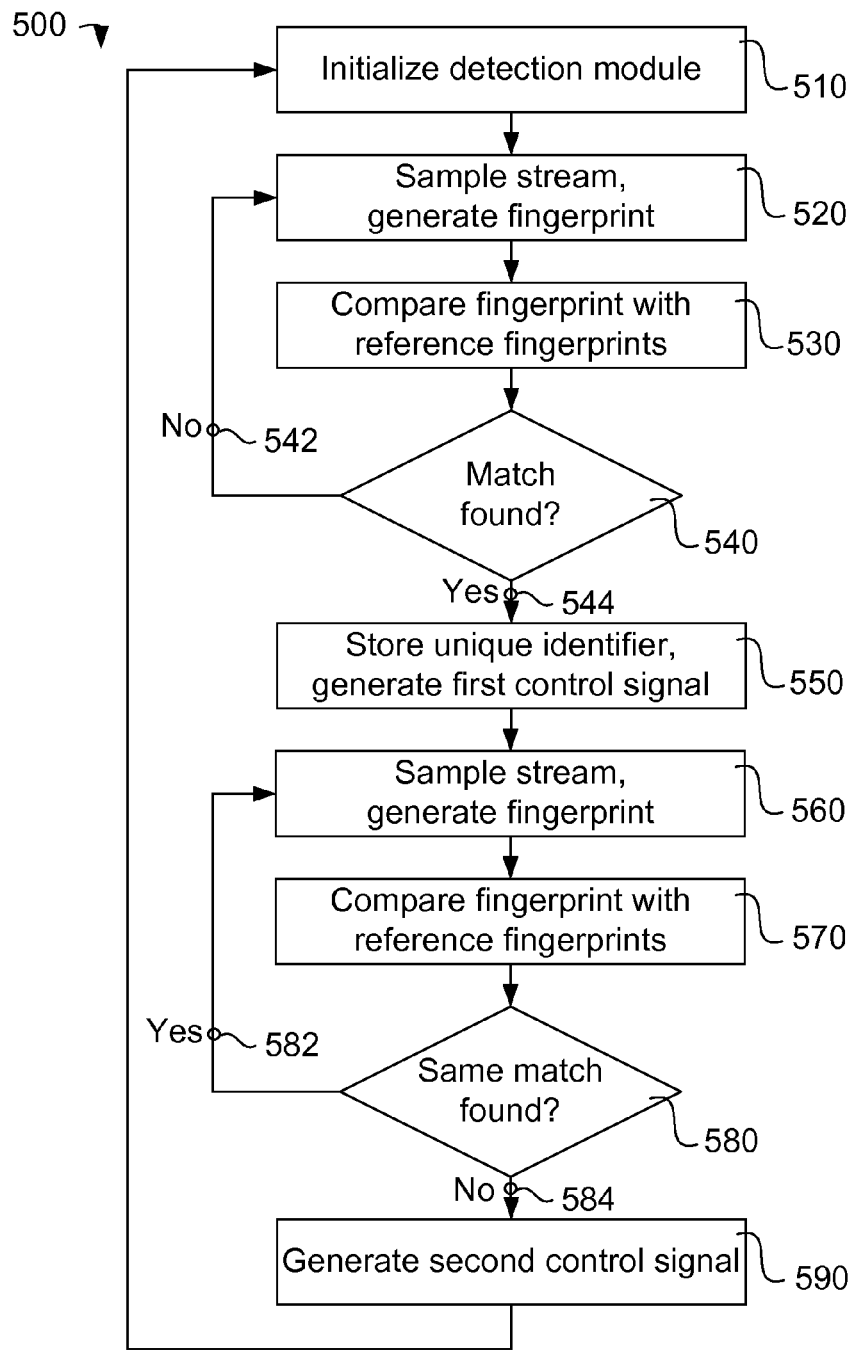
FIG. 5 depicts a flowchart of an exemplary process for monitoring a broadcast stream and generating control signals according to embodiments of the present invention.

FIG. 5 depicts a flowchart 500 of an exemplary process, according to embodiments of the present invention, to be executed in a detector 370 of exemplary systems 300 and 400. At a step 510, the detection module may be initialized. At a further step 520, samples may be extracted from a broadcast stream 365, and a fingerprint may be generated from the samples, for example, by means of a fingerprint generator 320. The samples may be taken, for example, from a video stream, from an audio stream, or from both video and audio streams. The fingerprints, for example, may be computed from and may represent a single field of video, a single frame of video, a series of sequential audio samples, or other data taken from the broadcast stream. At a further step 530, the generated fingerprint may be compared with a plurality of reference fingerprints, for example, those extracted from a fingerprint database 330. At a further step 540, a determination may be made whether the generated fingerprint matches a reference fingerprint. If no match is found 542, execution may return to a step 520. If a match is found 544, at a further step 550, a unique identifier associated with the matched reference fingerprint may be stored, and a first control signal may be generated. The control signal may include the unique identifier. At a further step 560, samples may be extracted from a broadcast stream 365, and a fingerprint may be generated from the samples. At a further step 570, the generated fingerprint may be compared with reference fingerprints. At a further step 580, a determination may be made whether the generated fingerprint matches a reference fingerprint. If a match is found 582, execution may return to step 560. If no match is found 584, at a further step 590 a second control signal may be generated, and execution may return to a step 510.

Figure 6:
FIG. 6 is a schematic representation of the content of three exemplary episodes of a television show.
Figure 6:
Figure 6:

Upon further development, the inventors of the current invention recognized that the exemplary process depicted in FIG. 5 may be inadequate in certain respects. FIG. 6 demonstrates a situation in which a more complex detection process may be required. In some series, every episode of the series, or all episodes in the current season of the series, may have the same introductory scene content. FIG. 6 illustrates, in schematic form, the content of three episodes 602, 604, 606 of a television series that share common content. Episode A 602 comprises introductory scene Intro, followed by scenes S2a, S3a, S4a, S5a, S6a, S7a, S8a, and S9a. Episode B 604 comprises introductory scene Intro, followed by scenes S2b, S3b, S4b, S5b, S6b, S7b, and S8b. Episode C 606 comprises introductory scene Intro, followed by scenes S2c, S3c, S4c, S5c, S6c, S7c, S8c, S9c, and S10c. In this circumstance, if a fingerprint database contains the reference fingerprints of Episode A 602, Episode B 604, and Episode C 606, fingerprints generated during the monitoring of any of the three episodes will match the reference fingerprints of all of the three episodes for the duration of the introductory scene, Intro, which would prevent an unambiguous identification of the actual episode being played. Inasmuch as the process depicted in FIG. 5 does not recognize the potential for ambiguous fingerprint matches, a more complex process may be required to handle this situation and other similar situations in which multiple episodes comprise common content.

A further deficiency of the exemplary process depicted in FIG. 5 may be that the process does not take account of the relative offsets of reference fingerprints that match with fingerprints generated from samples taken from the broadcast stream. Fingerprint matching algorithms known in the art are typically designed to process content that may have been degraded or distorted from the original, for example, audio content captured in an ambient environment that introduces noise, or audio content that has been temporally compressed or expanded. This robustness in matching may result in spurious matches between sampled content and reference content that is similar, but not identical. The finite duration of fingerprint sampling windows also allows for spurious matches in circumstances where fragments of the content are repeated, such as a short musical theme that repeats multiple times during a program. Robust identification of a program would preferentially utilize offset data from matched reference fingerprints to improve the rate of true positive matches and reduce the rate of false positive matches.

Figure 7A:
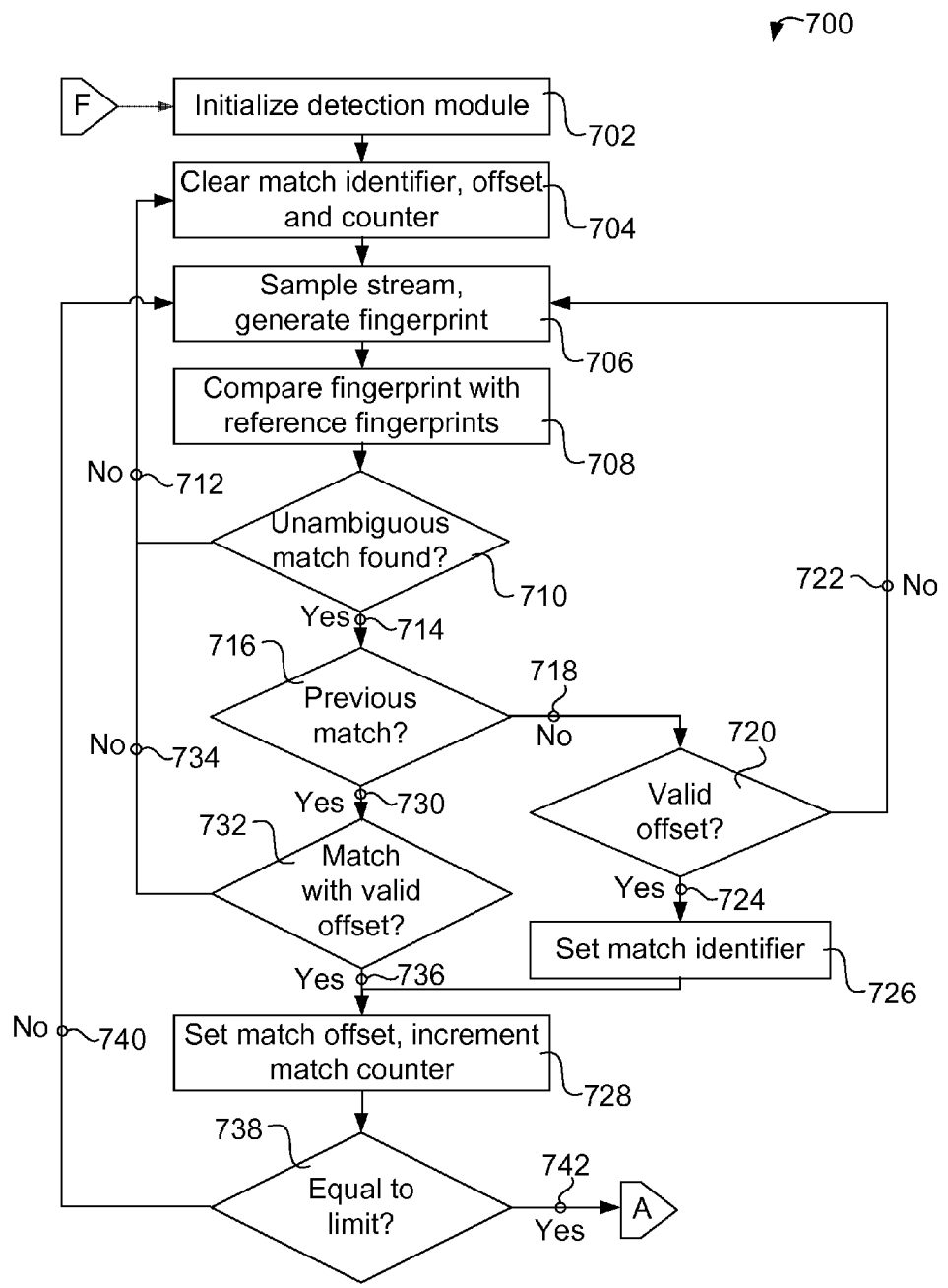
FIGS. 7*a*, 7*b*, and 7*c* depict a flowchart of an exemplary process for monitoring a broadcast stream and generating control signals according to embodiments of the present invention.
Figure 7B:
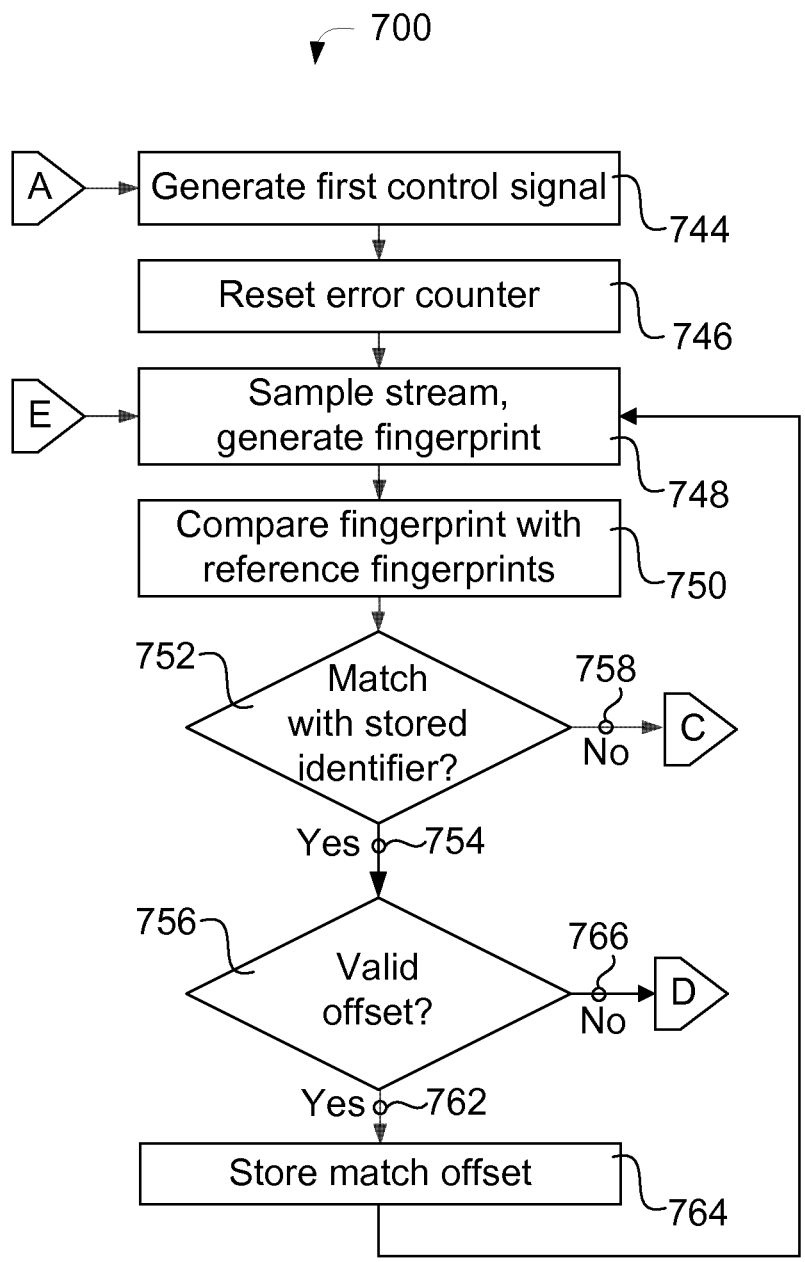
Figure 7C:
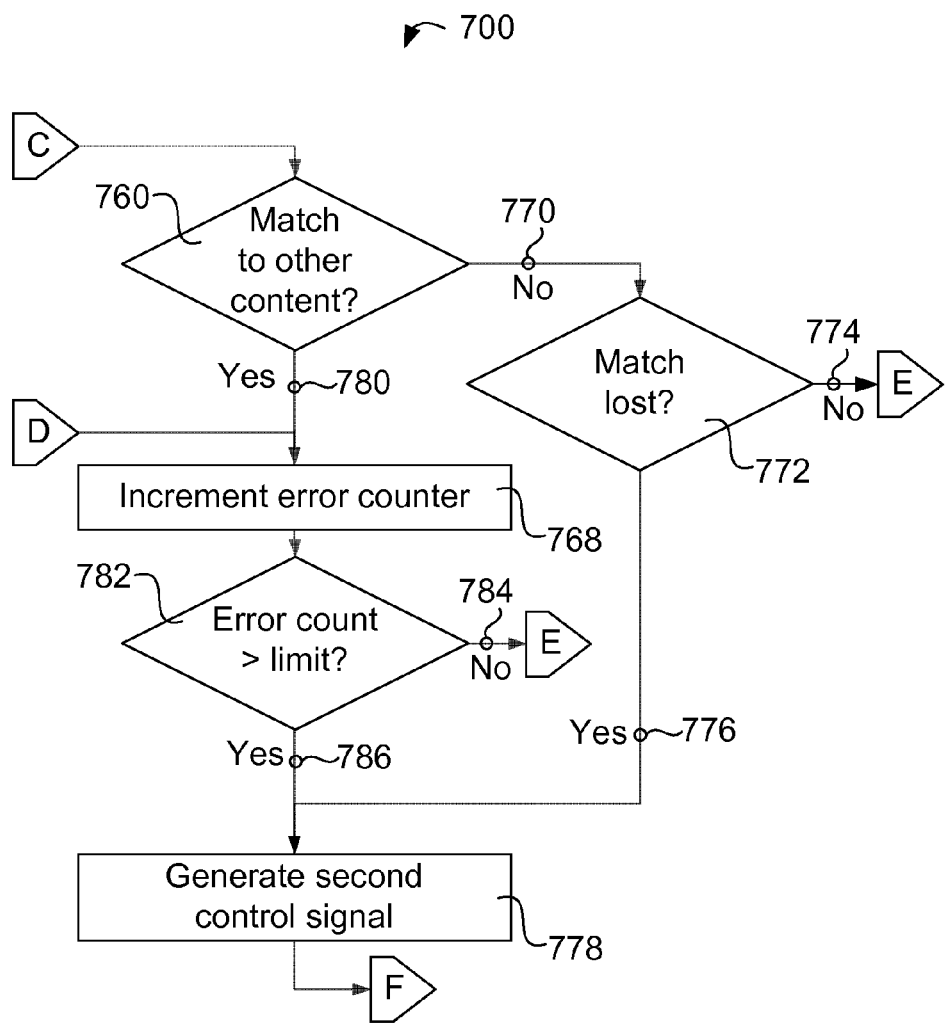

Accordingly, FIGS. 7a, 7b, and 7c depict a flowchart 700 of a preferred exemplary fingerprint matching process, according to embodiments of the present invention, to be executed in a detector 370 of exemplary systems 300 and 400. In FIG. 7a, an exemplary process 700 may commence at a step 702 at which a detection module may be initialized, erasing all memory of previous activity. At a further step 704, match identifier, offset, and counter storage locations may be cleared of their contents. At a further step 706, a selected broadcast stream may be sampled and a fingerprint may be generated, for example, by means of a fingerprint generator 320. The samples may be taken, for example, from a video stream, from an audio stream, or from both a video and an audio stream. The fingerprint, for example, may be computed from and may represent a single field of video, a single frame of video, a series of sequential audio samples, or other data taken from the broadcast stream. At a further step 708, the generated fingerprint may be compared with a plurality of reference fingerprints, for example, those extracted from a fingerprint database 330. At a further step 710, a determination may be made whether the generated fingerprint unambiguously matches a single reference fingerprint. If not 712, control returns to a step 704. If an unambiguous match is found 714, at a further step 716 a determination may be made whether a previous unambiguous match was made, for example, by checking for a value stored in a match-identifier storage location. If no previous match was made 718, at a further step 720 a determination may be made whether the offset corresponding to the unambiguous match is valid. When performing continuous sampling, a valid offset may be an offset within the initial portion of the program content, whereas an invalid offset may be an offset late in the program content. The test of step 720 allows the system to avoid a spurious match to content contained within later portions of the program content. This situation might arise, for example, in a program episode in which a later portion of the program episode contains preview content for the next successive program episode in the series. If at step 720 a determination is made that the offset is not valid 722, control returns to step 706. If at step 720 a determination is made that the offset is valid 724, at a further step 726, the identifier of the matching fingerprint may be remembered by storing the identifier in the match-identifier storage location. At a further step 728, the match offset storage location may be set with the offset of the matching reference fingerprint, and the match counter storage location may be incremented.

If at a step 716, a previous match was found 730, at a further step 732 a determination may be made whether the offset of the new matching reference fingerprint is valid with respect to the match offset stored in the match offset storage location. In the determination of step 732, the offset of the new match will be valid with respect to the previous match offset, for example, if the new offset is greater than the previous match, but the time difference between the new offset and the previous offset does not exceed a maximum value. The allowable difference between offsets may be determined by the type and nature of the fingerprints. For example, if fingerprints are generated from video content and each fingerprint represents a single frame of video, then, in some embodiments of the present invention, the allowable difference between two successive fingerprints should be no more than one frame of video. As another example, if fingerprints are generated from audio content and each fingerprint represents the values in a window of audio samples, then, in some embodiments of the present invention, the allowable difference between two matches should be no more than five times the step between two successive reference fingerprint windows. Defining a maximum allowable difference may compensate for the imprecise nature of fingerprint matches, particularly for audio samples, and may help make the process robust against sampling differences between reference and live samples.

If at step 732 a determination is made that the offset of the newly matched reference fingerprint is not valid 734 with respect to the previous match, control passes to step 704 and the search process restarts. If at step 732 a determination is made that the offset of the newly matched reference fingerprint is valid 736 with respect to the previous match, control passes to step 728. Following step 728, at a further step 738, a determination may be made whether the contents of the match counter storage location are equal to a predefined limit. A preferred value, in some embodiments of the present invention, for the predefined limit for accepting a program match is three consecutive matches. If at step 738 a determination is made that the match count is less than the limit 740, control may pass to step 706. If at step 738 a determination is made that the match count is equal to the limit 742, then control passes to a step 744 depicted in FIG. 7b.

With reference to FIG. 7b, at a step 744 a first control signal may be generated. At a further step 746, an error-counter storage location may be cleared. At a further step 748, the selected stream may be sampled and a fingerprint may be generated. At a further step 750, the generated fingerprint may be compared with a plurality of reference fingerprints. At a further step 752, a determination may be made if a match is found with a reference fingerprint whose identifier matches the identifier stored in the match identifier storage location. If a match is found 754, at a further step 756, a determination may be made whether the offset of the matching reference fingerprint is valid relative to the previous offset stored in the match offset storage location. In the determination of step 756, the offset of the new match will be valid with respect to the previous match offset, for example, in some embodiments of the present invention, if the new offset is greater than the previous match but the time difference between the new offset and the previous offset does not exceed a maximum value. In some embodiments of the present invention, the allowable difference between offsets may be determined by the type and nature of the fingerprints. Prior to step 756 the match with a given reference program has been made with high confidence, so the allowable difference at step 756 is greater than the allowable difference at step 732. Defining a maximum allowable difference at step 756 that is greater than the maximum allowable difference at step 732 may compensate for the imprecise nature of fingerprint matches, particularly for audio samples, and avoid situations where matches may not be found, for example in dark transitions in video or in low volume or silent intervals in the audio content. In some embodiments, for example, if fingerprints are generated from video content and each fingerprint represents a single frame of video, then the allowable difference between two successive fingerprints may be as great as three frames of video. In alternative embodiments, as another example, if fingerprints are generated from audio content and each fingerprint represents the values of a window of audio samples, then the allowable difference between two matches may be as long as the duration of the audio sampling window.

If at step 752 a determination is made that no match 758 is found with a reference fingerprint whose identifier matches the identifier stored in the match identifier storage location, control passes to a further step 760 depicted in FIG. 7c. If at step 756 a determination is made that the offset of the new match is valid 762 with respect to the previous match offset, at a further step 764, the offset of the new match is stored, and control passes to step 748. If at step 756 a determination is made that the offset of the new match is not valid 766 with respect to the previous match offset, control passes to a further step 768 depicted in FIG. 7c.

With reference to FIG. 7c, at a step 760 a determination may be made if a match is found between the newly-generated fingerprint and a reference fingerprint from any other program content. If no match is found 770, at a further step 772 a determination may be made if the match has been lost. In some embodiments of the present invention, a match may be lost if a sufficient period of sampling passes with no match being made to any generated fingerprint. For example, in some embodiments, if fingerprints are generated from video content and each fingerprint represents a single frame of video, then if four frames of video are fingerprinted without finding a matching reference fingerprint, then a determination may be made that a match is lost. As another example, if fingerprints are generated from audio content and each fingerprint represents the values of a window of audio samples, then, in some embodiments, if a period equal to the audio sample window passes without finding a matching reference fingerprint, a determination is made that a match is lost. If at step 772 a determination is made that the match has not been lost 774, control passes to step 748. If at step 772 a determination is made that the match has been lost 776, control passes to a further step 778.

If at step 760 a match to a reference fingerprint is found 780 with an identifier that does not match the stored match identifier, at a further step 768, an error counter storage location may be incremented. At a further step 782, a determination may be made whether the error count exceeds a predefined limit. In some embodiments of the present invention, a preferred value for the predefined limit for the error count may be three consecutive errors without a valid match. If the error count is less than the predefined limit 784, control passes to step 748. If the error count exceeds the predefined limit 786, at a further step 778 a second control signal may be generated, and control passes to step 702 where the process may restart.

By way of further explanation of embodiments of the current invention, consider the use of system 300 utilizing the detection method depicted in flowchart 700 operating on the content depicted in FIG. 2. The original content 200 depicted in FIG. 2 is received by principal content receiver 310 and passed through fingerprint generator 320. The resulting plurality of reference fingerprints is stored in fingerprint database 330. Supplementary content is received and stored in supplementary-content database 350. Suppose the broadcast content 365 being sampled by detector 370 contains the first broadcast 202 content depicted in FIG. 2. At the beginning of scene S1, detector 370 will sample the content of scene S1 and generate fingerprints at step 706. After some latency that depends on the fingerprint generation algorithm, at steps 708 and 710 generated fingerprints will begin to match the reference fingerprints stored in fingerprint database 330. After a sufficient number of matches at step 738, at step 744 a first control signal will be generated. As the broadcast continues, broadcast content will be sampled and reference fingerprints will be generated at step 748, and at step 750, 752, and 756, the generated fingerprints will continue to match reference fingerprints with valid offsets throughout the broadcast of scenes S1 and S2. Subsequent to the beginning of interstitial pod C1a, at step 752 generated fingerprints will not match reference fingerprints, since the content of C1a does not appear in the original program content and fingerprint database 330 will not contain fingerprints that match those generated during C1a. Once a sufficient period elapses with no matching fingerprints, at step 772 a loss of match will be determined and at step 778 a second control signal will be generated. At the end of interstitial pod C1a, and after a latency that depends on the fingerprint generation algorithm, at steps 708 and 710 generated fingerprints from scene S3 will again begin to match the reference fingerprints stored in fingerprint database 330. After a sufficient number of matches at step 738, at step 744 a first control signal will again be generated. Matching will continue at steps 752 and 756 until interstitial pod C2a, at which point the match will be lost at step 772 and a second control signal will be generated at step 778. This pattern will continue throughout the illustrated period of the first broadcast 202.

If at a later time the broadcast content contains the second broadcast 204 content depicted in FIG. 2, a similar pattern of first and second control signals will be generated, although the precise timing of the signals will vary according to the placement and duration of the interstitial pods. Similarly, if at a later time the broadcast content contains the third broadcast 206 content depicted in FIG. 2, a similar pattern of first and second control signals will be generated, although in this case the first occurrence of the second control signal will occur during the middle of scene S3, and the second occurrence of the first control signal will occur following the end of interstitial pod C1c but during the middle of scene S3.

Figure 8:
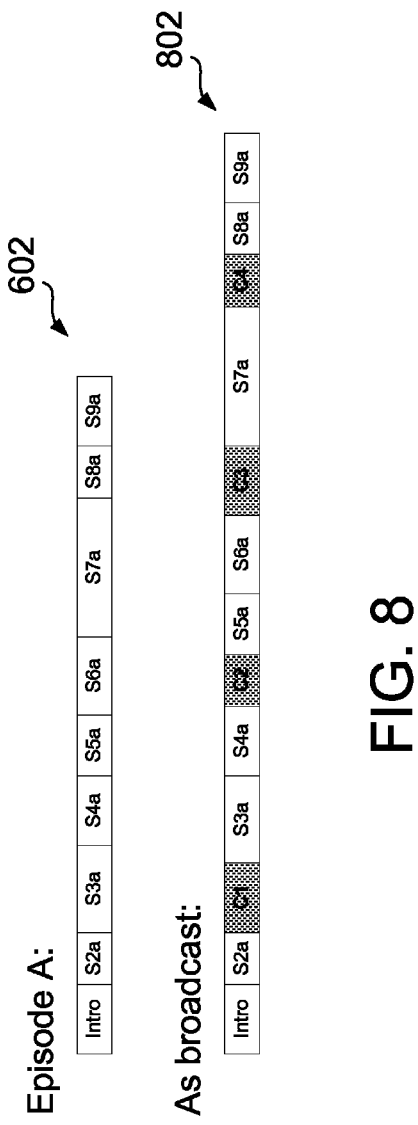
FIG. 8 is a schematic representation of an exemplary broadcast of an episode of a television show.

FIG. 8 depicts an exemplary scenario for the broadcast and recognition of the content depicted in FIG. 6. Again, by way of further explanation of embodiments of the current invention, consider the use of system 300 utilizing the detection method depicted in flowchart 700 operating on the broadcast content as depicted in FIG. 8. The original content of Episode A 602 is received by principal content receiver 310 and passed through fingerprint generator 320. The resulting reference fingerprints are stored in fingerprint database 330. Supplementary content is received and stored in supplementary-content database 350. Suppose the broadcast content 365 being sampled by detector 370 contains the as-broadcast content 802 depicted in FIG. 8, where interstitial pods C1, C2, C3, and C4 are interspersed in the content of Episode A. At the beginning of scene Intro, detector 370 will sample the content of scene Intro and generate fingerprints at step 706 that when compared with the reference fingerprints stored in fingerprint database 330 at step 708 will unambiguously match the reference fingerprints for the Intro scene of Episode A at step 710. After a sufficient number of consecutive matches at step 738, a first control signal will be generated at step 744. Fingerprints generated from sampled content at step 748 will continue to match at step 752 until the start of interstitial pod C1. After no match is found at step 772, a second control signal will be generated at step 778, and the process will restart. Subsequently a first control signal will be generated after the start of scene S3a, and a second control signal will be generated after the start of interstitial pod C2. Likewise, first control signals will be generated after the starts of scenes S5a, S7a, and S8a, and second control signals will be generated after the ends of scenes S4a, S6a, S7a, and S9a.

As described above, the contents of each of the three episodes depicted in FIG. 6 contains the same introductory scene. A robust detection system must be capable of disambiguating these episodes despite the presence of the common material. By way of illustration of this requirement, FIG. 9 depicts another exemplary scenario for the broadcast and recognition of the content depicted in FIG. 6. Again, by way of further explanation of the current invention, consider the use of system 300 utilizing the detection method depicted in flowchart 700 operating on the broadcast content as depicted in FIG. 9. The original content of Episodes 1 602 and 2 604 is received by principal-content receiver 310 and passed through fingerprint generator 320. The resulting plurality of reference fingerprints is stored in fingerprint database 330. Supplementary content is received by supplementary-content receiver 340 and stored in supplementary-content database 350. Suppose the broadcast content 365 being sampled by detector 370 contains the as-broadcast content 902 depicted in FIG. 9, where interstitial pods C1, C2, C3, and C4 are interspersed in the content of Episode A 602. At the beginning of scene Intro, detector 370 will sample the content of scene Intro and generate fingerprints at step 706 that will match the reference fingerprints stored in the reference fingerprint database 330 at step 708 for both scene Intro of Episode A and scene Intro for Episode B 604. Accordingly, at step 710 a determination is made that an unambiguous match is not found 712, so control will pass to step 704 without a match identifier being set. Only when scene S2a begins to play will detector 370 generate fingerprints at step 706 that when compared with the reference fingerprints at step 708 will produce an unambiguous match 714 with the reference fingerprints from the content of Episode A 602. After a sufficient number of consecutive matches from the content of scene S2a at step 738, a first control signal will be generated at step 744. Therefore, in this scenario 902 the first control signal will be delayed relative to the scenario 802 shown in FIG. 8, because unambiguous identification of the content is not possible during the introductory scene, which is common to both Episode A 602 and Episode B 604. After the initial match, fingerprints generated from sampled content at step 748 will continue to match at step 750 until the start of interstitial pod C1, at which point no match will be found at step 772 and at step 778 a second control signal will be generated, and the process will restart. Thereafter the generation of first and second control signals will proceed as described above with respect to the scenario 802 depicted in FIG. 8.

Further considering the broadcast of the content depicted in FIG. 6, FIG. 10 depicts a broadcast scenario that is problematic for proper detection and identification. In this scenario reference content comprises Episode B 604, while broadcast content comprises Episode A 602. Consider the use of system 300 utilizing the detection method depicted in flowchart 700 operating on the broadcast content as depicted in FIG. 10. The original content of Episode B 604 is received by principal content receiver 310 and passed through fingerprint generator 320. The resulting plurality of reference fingerprints is stored in fingerprint database 330. Supplementary content is received and stored in supplementary-content database 350. Suppose the broadcast content 365 being sampled by detector 370 contains the as-broadcast content 1002 depicted in FIG. 10, where interstitial pods C1, C2, C3, and C4 are interspersed in the content of Episode A 602. At the beginning of scene Intro, detector 370 will sample the content of scene Intro and generate fingerprints at step 706 that will match the reference fingerprints stored in the reference fingerprint database 330 at step 708 for scene Intro for Episode B 604, even though the content of Episode A 602 is being broadcast. Accordingly, at step 710 an erroneous but unambiguous match will be found, and after a sufficient number of sequential matches within scene Intro at step 738, a first control signal will be generated at step 744. This first control signal will identify the content as being Episode B 604, based on the matches generated by the common introductory material, but this identification is in error. Subsequently, fingerprints generated at step 748 and compared with reference fingerprints from fingerprint database 330 at step 750 will continue to match at steps 752 and 756. Only when scene S2a is being sampled will fingerprints fail to match at step 772, and at step 778 a second control signal will be generated. Subsequently fingerprints sampled from the remainder of the as-broadcast content 1002 will fail to match with the reference fingerprints of Episode B 604, so no further first or second control signals will be generated for the duration of the as-broadcast content 1002.

The inventors of the current invention recognized this problem scenario and developed alternative embodiments of the present invention comprising a method to avoid this improper content recognition. This method may be useful in any situation where a number of episodes of a program share common introductory material, but not all of the episodes that may be broadcast have been provided as reference content to be stored in the fingerprint database. This method is depicted in schematic form in FIG. 11. In this method, a new dummy reference episode 1100 may be created comprising the initial common content from any of the episodes of the series. The dummy reference episode 1100, which is labeled as Dummy Episode in the exemplary scenario depicted in FIG. 11, may be supplied to principal content receiver 310 along with the normal episode content. The dummy reference content may be passed through the fingerprint generator 320 and the resulting plurality of reference fingerprints may be stored in fingerprint database 330. The presence of the reference fingerprints for the dummy reference in the fingerprint database will cause ambiguous matches to occur during the initial common content. Because in this scenario an unambiguous match will never be made to the dummy reference content, supplementary content associated with the dummy reference content is not required.

Consider the use of system 300 utilizing the detection method depicted in flowchart 700 operating on the broadcast content as depicted in FIG. 11. The original content of Episode B 604 and Dummy Episode 1100 is received by principal content receiver 310 and passed through fingerprint generator 320. The resulting plurality of reference fingerprints is stored in fingerprint database 330. Supplementary content for Episode B 604 is received and stored in supplementary-content database 350. Suppose the broadcast content 365 being sampled by detector 370 contains the as-broadcast content 1102 depicted in FIG. 11, where interstitial pods C1, C2, C3, and C4 are interspersed in the content of Episode A 602. At the beginning of scene Intro, detector 370 will sample the content of scene Intro and generate fingerprints at step 706 that will match the reference fingerprints stored in the reference fingerprint database 330 at step 708 for both scene Intro of Episode B 604 and scene Intro for Dummy Episode 1100. Accordingly, at step 710 a determination is made that an unambiguous match is not found, so control will pass to step 704 without a match identifier being set. This situation will persist through scene Intro, and no unambiguous match will be found. When scene S2a begins to play, detector 370 will generate fingerprints at step 706 that when compared with the reference fingerprints at step 708 will produce no matches, so during the further playout of the as-broadcast content 1102 depicted in FIG. 11, no control signals will be generated. Thus, the presence of the reference fingerprints for Dummy Episode 1100 in the fingerprint database 330 prevents the improper identification of the content of the Intro scene, and the system 300 performs as desired.

While preferred embodiments of the invention have been illustrated and described, as noted above, many changes can be made without departing from the spirit and scope of the invention. Accordingly, the scope of the invention is not limited by the disclosure of a preferred embodiment. Instead, the invention should be determined entirely by reference to the claims that follow.

What is claimed is:

1. In a computer system, a method for controlling a distribution of supplementary content, the method comprising:
   receiving a media content comprising at least one of an audio content and a video content;
   receiving a supplementary content associated with the media content;
   monitoring a broadcast stream;
   when the monitoring initially detects the at least one of an audio content and a video content:
      determining that a count of unambiguous matches for the at least one of an audio content and a video content, when compared to a reference database, meets a first criterion in relation to a first predefined limit;
      based on the count of unambiguous matches for the at least one of an audio content and a video content, when compared to the reference database, meeting the first criterion in relation to the first predefined limit, selecting the supplementary content based on the detected media content;
      generating a first control signal; and
      using the first control signal to insert the selected supplementary content into the broadcast stream; and
   when the monitoring fails to detect the at least one of an audio content and a video content subsequent to the initial detection:
      determining that an error count of match failures for the at least one of an audio content and a video content, when compared to the reference database, meets a second criterion in relation to a second predefined limit;
      generating a second control signal; and
      using the second control signal to cease to insert the selected supplementary content into the broadcast stream.

2. The method of claim 1, further comprising:
   upon receiving the media content and the supplementary content associated with the media content, assigning a unique identifier to an enhanced media content comprising the media content and the supplementary content.

3. The method of claim 2, further comprising creating a first database, wherein the creating the first database comprises:
   generating a plurality of reference fingerprints from the at least one of an audio content and a video content;
   associating the plurality of reference fingerprints with the unique identifier of the enhanced media content; and
   storing the plurality of reference fingerprint, the unique identifier, and the association in the first database.

4. The method of claim 3, further comprising:
   generating a first fingerprint from at least one of a received audio content and a received video content from the monitored broadcast stream;
   comparing the first fingerprint with the plurality of reference fingerprints;
   wherein the monitoring initially detects the at least one of an audio content and a video content when a match between any reference fingerprint in the plurality of reference fingerprints and the first fingerprint is initially determined.

5. The method of claim 4, further comprising extracting the unique identifier associated with the plurality of reference fingerprints from the first database when the monitoring initially detects the at least one of an audio content and a video content.

6. The method of claim 3, further comprising:
   generating a first fingerprint from at least one of a received audio content and a received video content from the monitored broadcast stream;
   comparing the first fingerprint with the plurality of reference fingerprints;
   wherein the monitoring fails to detect the at least one of an audio content and a video content when none of the reference fingerprints in the plurality of reference fingerprints matches the first fingerprint.

7. The method of claim 2, further comprising creating a second database, wherein creating the second database comprises:
   creating an association between the unique identifier for the enhanced media content and the supplementary content associated with the media content;
   storing the unique identifier, the supplementary content, and the association in the second database; and
   using the unique identifier to extract supplementary content from the second database.

8. A system for the control of a distribution of supplementary content, the system comprising, in a processor:
   a receiver module configured to receive:
      a media content comprising at least one of an audio content and a video content; and
      a supplementary content associated with the media content;
   a monitor module configured to monitor a broadcast stream;
   a detector module configured to:
      detect, in the broadcast stream, the least one of the audio content and the video content of the received media content; and
      upon initially detecting the at least one of the audio content and the video content:
         to determine that a count of unambiguous matches for the at least one of an audio content and a video content, when compared to a reference database, meets a first criterion in relation to a first predefined limit; and to generate a first control signal; and after failing to detect, subsequent to the initial detection, the at least one of the audio content and the video content:

to determine that an error count of match failures for the at least one of an audio content and a video content, when compared to the reference database, meets a second criterion in relation to a second predefined limit; and to generate a second control signal; and a control module configured to:

select, based on the count of unambiguous matches for the at least one of an audio content and a video content, when compared to the reference database, meeting the first criterion in relation to the first predefined limit, a first supplementary content based on the detected at least one of the audio content and the video content; and use the first control signal to insert the first supplementary content into the broadcast stream and the second control signal to cease to insert the first supplementary content into the broadcast stream.

9. The system of claim 8, further comprising, in the processor:

an identifier module configured to assign a unique identifier to an enhanced media content comprising the media content and the supplementary content.

10. The system of claim 9, further comprising, in the processor:

a fingerprint module configured to compute a plurality of reference fingerprints from the received media content; and a first database module configured to:

receive the plurality of reference fingerprints and the unique identifier;

associate the plurality of reference fingerprints and the unique identifier, and store and retrieve the plurality of reference fingerprints, the unique identifier, and the association between the plurality of reference fingerprints and the unique identifier;

wherein the monitor module is further configured to:

generate a first fingerprint from at least one of a received audio content and a received video content in the monitored broadcast stream;

compare the first fingerprint with the plurality of reference fingerprints retrieved from the first database module; and determine whether the first fingerprint matches any fingerprint in the plurality of reference fingerprints.

11. The system of claim 9, further comprising, in the processor:

a second database module configured to:

receive the supplementary content and the unique identifier;

associate the supplementary content and the unique identifier, and store and retrieve the supplementary content, the unique identifier, and the association between the supplementary content and the unique identifier.

* * * * *